United States Patent Office 3,780,113
Patented Dec. 18, 1973

3,780,113
PREPARATION OF ORGANIC SULPHUR COMPOUNDS
Donald J. Martin, Irvington, N.Y., assignor to Stauffer Chemical Company, New York, N.Y.
No Drawing. Continuation of abandoned application Ser. No. 825,951, May 19, 1969. This application Dec. 10, 1971, Ser. No. 208,047
Int. Cl. C07c *149/06*
U.S. Cl. 260—609 R    8 Claims

ABSTRACT OF THE DISCLOSURE

Hydrogen sulfide and an essentially hydrocarbon compound having an olefinic linkage are reacted in the presence of a free radical initiating compound and a pentavalent phosphorus compound.

This is a continuation of application Ser. No. 825,951, filed May 19, 1969, and now abandoned.

SPECIFICATION—GENERAL

This invention relates to an improved process for reacting hydrogen sulfide with an essentially hydrocarbon compound having at least one olefinic linkage. Specifically, it relates to the use of pentavalent organic phosphorus compounds containing at least one phosphorus to sulfur bond, as promoters in the reaction of hydrogen sulfide with an essentially hydrocarbon compound having an olefinic linkage in the presence of a free radical initiating compound.

BACKGROUND OF THE INVENTION

The reaction of hydrogen sulfide with hydrocarbons containing the olefinic linkage in the presence of free radical catalysts is well known in the art. The process is generally characterized by incomplete conversion and low yields of the desired mercaptans. Even though the free radical initiated reaction of hydrogen sulfide with α-olefins produces useful primary mercaptans directly, the poor yields and the production of by-products, such as sulfides and disulfides, have been such that manufacturers have resorted to indirect synthesis routes, for example, the synthesis of primary mercaptans from chlorinated hydrocarbons. Various promoters have been employed to increase the yield of desired mercaptans in the olefin synthesis. Water has been proposed as a promoter and gives increased yields of mercaptans but large amounts of olefin still remain unconverted. Actinic light has been used alone and together with various promoters, including certain trialkyl phosphites, in the reaction of hydrogen sulfide with an olefin but these processes require equipment which is expensive, difficult to make and maintain, and the yields of mercaptan are relatively low compared to the chlorinated hydrocarbon synthesis.

BRIEF DESCRIPTION OF THE INVENTION

It has been discovered that substantially increased yields can be obtained in conventional equipment by carrying out the reaction of hydrogen sulfide and an essentially hydrocarbon compound containing at least one olefinic linkage in the presence of a free radical initiating compound and a novel promoter consisting of a pentavalent phosphorus compound having at least one phosphorus to sulfur bond.

The mercaptans produced by the process of this invention have wide utility as raw materials for the manufacturing of herbicides, insecticides, repellants, rubber vulcanizers and surfactants.

DETAILED DESCRIPTION OF THE INVENTION

The present invention is directed to the free radical initiated reactions of hydrogen sulfide as distinct from the acid or base catalyzed reactions. In the ionic (acid or base) catalyzed reactions, hydrogen sulfide addition across the olefinic linkage takes place in accordance with the Markownikoff Rule, i.e. "normal" addition in which the sulfhydryl group attaches to the unsaturated carbon atom having the lesser number of hydrogen atoms attached thereto. In the free radical initiated reaction, "abnormal" addition or contra-Markownikoff addition takes place, that is the sulfhydryl group attaches to the unsaturated carbon atom having the most hydrogen attached thereto. For example, when an α-olefin is reacted under acid catalyzed conditions, a secondary mercaptan, namely a 2-thiol, is formed; whereas in the free radical initiated reaction, the α-olefin is converted to a primary mercaptan, namely a 1-thiol.

The present invention is further directed to the reactions of hydrogen sulfide with an essentially hydrocarbon compound having an olefinic linkage in the presence of a free radical initiating compound.

In accordance with the present invention, hydrogen sulfide and a hydrocarbon or substituted hydrocarbon containing at least one olefinic linkage are reacted in the presence of a free radical initiating compound and a pentavalent organic phosphorus compound containing at least one phosphorus to sulfur bond. Pentavalent organic phosphorus compounds which act as promoters in this reaction have the generic formula:

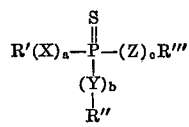

where X, Y and Z are each chalcogens having an atomic weight between 15 and 33; $a$, $b$ and $c$ are each equal to 0 or 1; and R', R'' and R''' are each hydrocarbon radicals having from 1 to about 20 carbon atoms. The hydrocarbon radicals can be alkyl, aryl, alkaryl or arylalkyl. In the preferred embodiment of the invention these radicals are lower alkyl having from 1 to 4 carbon atoms or aryl having from 6–9 carbon atoms. These compounds are illustrated by the organic thiophosphates, thiophosphonates and thiophosphinates containing from 1 to 4 sulfur atoms adjacent to the phosphorus atom. The preferred promoters for this invention are the trimethyl, triethyl, tripropyl, tributyl and triphenyl thiophosphates and thiophosphonates.

The free radical initiating compounds which can be employed in the present invention include peroxide compounds, organic azo compounds, peracids and percarbonates. Thus the various azo initiators which cause the addition of hydrogen sulfide to an olefin by way of a free radical mechanism can be used. For instance, the azo initiators which have an acyclic azo group, —N=N—, bonded to different non-aromatics, that is aliphatic or cycloaliphatic carbons, at least one of which is tertiary can be used in the process of this invention. Suitable azo compounds for use in this invention are described in U.S. Pat. 2,551,813 and are illustrated by azobisisobutyronitrile, azobis (α,γ-dimethyl valeronitrile), azobis (α-methyl-α-carboxybutyronitrile), azobisisobutyramidine hydrochloride, azodicyclohexanecarbonitrile, α (carbamylazo) isobutyronitrile, α (carbamylazo)-α,γ-dimethylvaleramide, hexyl-α (carbamylazo) α,γ-dimethylvalerate, α,α'-azobis (α-methyleneanthonitrile), α,α'-azobis (α-cyclopropylpropionitrile), α,α'-azobis - (α,γ - dimethylcapronitrile) and 1,1'-azodicycloheptanecarbonitrile. While di-tertiary alkyl peroxides such as ditertiary butyl peroxide are highly effective initiators for the present invention, the other dialkyl peroxides, alkylhydroperoxides, alkyl peroxy esters and diacyl peroxides are also effective initiators for this process. Illustrative of the peroxide compounds which can be employed in the present invention are ditertiarybutyl peroxide, benzoyl peroxide, lauroyl peroxide, caprylyl peroxide, acetyl peroxide, methyl ethyl ketone peroxide, dicumyl peroxide, pinane hydroperoxide, cumene hydroperoxide, t-butyl hydroperoxide, menthane hydroperoxide, p-cyclobenzoyl peroxide, 2,4-dichlorobenzoyl peroxide, hydroxyheptaldehyde peroxide, dibenzal diperoxide, methyl isobutyl ketone peroxide, cyclohexanone peroxide. The "hot catalysts" such as percarbonates, peracids and peracid esters can also be used in this invention. By the term "hot catalyst" it is meant those catalysts which have a half-life of 10 hours at temperatures less than 60° C. The percarbonates can be illustrated by isopropyl percarbonate, diisopropyl, peroxydicarbonate and t-butylperoxy isopropyl percarbonate. The peracids and peracid esters are exemplified by t-butyl perbenzoate, t-butyl peroxypivalate, di-t-butyl diperphthalate, t-butyl permaleic acid, t-butyl peracetate, t-butyl peroxyisobutyrate and t-butyl perphthalic acid.

The initiators used in this invention have heretofore been employed at temperatures sufficiently high enough to decompose the initiator into free radicals and yet sufficiently low enough to control the half-life of the initiator so that said initiator can sustain the reaction for about 1 to about 6 hours. The optimum temperature varies with the particular initiator used. Therefore, prior to this invention, azobisisobutyronitrile (AIBN) was employed at temperatures in the range from about 80 C. to about 110° C. in the free radical addition of hydrogen sulfide to an olefin. Likewise di-tertiarybutyl peroxide was employed at 130° C. to 160° C. whereas tertiarybutyl hydroperoxide was employed at temperatures from about 120° C. to about 150° C. When the process of the present invention is employed, however, lower temperatures can be used without substantially affecting the conversions of olefin and yield of the mercaptan. Therefore (AIBN) azobisisobutyronitrile can be used at temperatures ranging from about 40° C. to about 110° C. without substantially affecting the yield and this initiator was still effective at temperatures down to 0° C. whereas without the promoters of this invention the minimum temperature applicable for using (AIBN) azobisisobutyronitrile under the same pressure was about 70° C. The temperatures at which the initiator may be used will vary with that particular initiator but each can be used at a lower temperature than was previously feasible without the promoter of this invention.

The hydrogen sulfide used is preferably of high purity. Although water may be present in the system, better yields were obtained when the anhydrous reaction was carried out. To maximize the formation of mercaptans and minimize the formation of thioethers, ratios of hydrogen sulfide to hydrocarbon of at least one or greater, that is from 1 to about 20 moles $H_2S$/mole of hydrocarbon should be used, the higher the mole ratio, the higher is the molar ratio of mercaptan to sulfide in the product.

In the process of the present invention, an essentially hydrocarbon compound having at least one olefinic linkage is used. By essentially hydrocarbon compound we mean consisting essentially of carbon and hydrogen. It may contain two or more olefinic linkages, for example 1,3-butadiene, isoprene or the like can be used. However, the hydrocarbon must contain at least one olefinic linkage in the aliphatic or cycloaliphatic grouping as distinct from the unsaturated linkage in an aromatic molecule such as benzene. The carbon atoms containing the olefinic linkage can have attached thereto an alkyl, cycloalkyl, aryl, arylalkyl, alkaryl or other branched or straight chained hydrocarbon substituent. Furthermore, the group attached to the olefinic carbon atoms can be substituted hydrocarbons having substituents which are inert with respect to the reaction of the present invention. Illustrative of such inert substituents are: cyano, carboxyl, carbonyl, tertiary amines, halogens, sulfoxides, sulfones, hydroxyl, ethers, thioethers, carboxylic esters, amides, and the like. Trivalent and pentavalent phosphorus groups can also be attached to the hydrocarbon radicals.

This invention is particularly useful for the manufacture of primary mercaptans from hydrocarbons having an olefinic linkage to a terminal carbon atom, that is an α-olefin. For example, 1-butene can be converted in high yield to 1-butanethiol, likewise 1-octene and 1-dodecene can be converted to 1-octanethiol and 1-dodecanethiol respectively. Thus α-olefins having from 2–30 carbon atoms can be converted to their corresponding primary mercaptans. Suitable olefins for this reaction include ethylene, propylene, 1-butene, isobutene, 1-pentene, 1-hexene, 1-octene, 1-nonene, styrene, 1-dodecene, 1-decene, 1-tridecene, 1-undecene, 1-heptadecene, 2-methylhexene-1, 3 - methyl - 2 - ethyl - 1 - pentene, 3,3-dimethyl-1-heptene, 4-methyl, 2-propyl-1-pentene, vinyl cyclohexane, 3-phenyl-1-pentene, 1,3-butadiene, 1,3-pentadiene, 1,5-hexadiene, 1,7-octadiene, 3,4-diethyl-1,5-hexadiene, propylene dimer, propylene trimer, propylene tetramer, 3-chloro-1-hexene, 5-nitro-1-pentene, p-chloro-styrene, m-nitro-styrene and 5-cyano-1-pentene.

In addition to the olefins described above, olefins having inert groups (with respect to the present invention) attached directly to the olefinic carbon atoms can be employed in the present invention. These inert groups can be illustrated by: cyano, halogen, ethers, carboxyl and carboxylate (including both the acrylic esters, in which the olefinic carbon atom is linked to the carboxyl carbon atom, and the vinyl esters, in which the olefinic carbon atom is linked to an oxygen atom of the carboxyl group) and the like. Examples of this type of compound are: vinyl chloride, vinyl bromide, 3-ethoxy-pentene-2,2-chloroeicosene-2,2-butenyl phenyl ethyl ether, methyl vinyl ether, divinyl ether, acrylic acid, ethyl acrylate, methyl methacrylate, maleic acid, ethyl acrylate, 2-cyano-2-butene and the like.

The reaction of the present invention can be run in a batch system, a continuous operation, or in a series of reactors. For example, all of the hydrogen sulfide, olefin, initiator and promoter can be added at once or the olefin and hydrogen sulfide can be added as separate streams to a continuous reactor system with an appropriate addition of the initiator and promoter in the desired proportions, either separately or along with the olefin or hydrogen sulfide. If desired, a coil reactor can also be employed with injection of the initiator along the coil at various points.

The amount of the novel phosphorus reaction promoters used in this invention will vary over a wide range and it will depend upon various factors such as the particular promoter used, the amount of catalyst used, etc. The amount of phosphorus compound used in this invention will be the amount sufficient to promote the reaction and increase the conversion of the unsaturated compound. For most applications, the amount of reaction promoter needed will be in the range of 0.001 to 1.0 mole of promoter per mole of each olefinic linkage. The preferred range being from about 0.001 to about 0.5 mole of promoter per mole of olefinic linkage. At these promoter levels the amount of initiator used will be in the range from about 0.0001 to about 0.01 mole of initiator/mole of olefinic linkage.

The reaction of the present invention can be run with or without a diluent. The diluent should be inert with respect to the reactants and the products. Suitable diluents include saturated and aromatic hydrocarbons. These diluents can be illustrated by pentane, hexane, octane, cyclohexane, benzene, toluene, and xylene.

The following examples further illustrate the practice of the present invention. Example 1 is the control employing no promoter.

EXAMPLE 1

0.1 gm. of azobisisobutyronitrile and 50 ml. of benzene were placed in a stainless steel autoclave equipped with a gas inlet, thermocouple well, 3000 p.s.i. pressure gauge and a rupture disc assembly rated at 2000 p.s.i. The autoclave was then sealed and evacuated, although evacuation was shown to be not necessary. After cooling the autoclave in a nitrogen bath, 0.2 mole of ethylene and 1.0 mole of hydrogen sulfide was added. The autoclave was then heated to 90–92° C. in 2 hours and maintained at that temperature for 9 hours. The reaction mixture is then cooled to 10° C. and is analyzed with a gas chromatograph using a 12' x ⅛" coil column containing 3% OV–1 on 80–100 mesh Chromosorb G. 36% of the ethylene was converted to ethyl mercaptan (29.5% of initial ethylene) and ethyl sulfide (6.5%).

EXAMPLE 2

0.1 gm. of azobisisobutyronitrile, 2 gm. of triethyl thionophosphate and 50 ml. of benzene were placed in a stainless steel autoclave. The autoclave was then sealed and evacuated. After cooling the autoclave in a nitrogen bath, 0.2 mole of ethylene and 1.0 mole of hydrogen sulfide was added. The autoclave was then heated to 89–91° C. in 2 hours and maintained at the temperature for 6 more hours. The autoclave was then cooled to 10° C. and analysis of the product by the method of Example 1 revealed that 59% of the ethylene had been converted to ethyl mercaptan (43%) and ethyl sulfide (16%). Thus the promotional effect of the triethyl thiophosphate is obvious from a comparison of Examples 1 and 2.

When the procedure of Example 2 is followed but no benzene is present, the conversion of ethylene remains the same but slightly lower amounts of ethyl mercaptan are obtained. Thus the reaction of the present invention can be run with or without an inert solvent, but higher yields of mercaptan are obtained when such a solvent is used.

In like manner the the following are known to promote the reaction of hydrogen sulfide with an olefin in the presence of a free radical initiating compound; trimethyl thiophosphate, tributyl thiophosphate, triphenyl thiophosphate, tripropylthiophosphate, O,O'-dimethyl methyl thiophosphonate, O,S-dimethyl methylthiophosphonate, O,O-diphenyl ethyl thiophosphonate, O,S-dibutyl butyl thiophosphonate, S,S'-diethyl ethyl thiophosphonate (S,S-diethyl ethyl phosphonotrithioate), trimethyl thiophosphinate, S-methyl dimethyl thiophosphinate, O-phenyl diethyl thiophosphinate, and alkyl and aryl phosphine sulfides.

What is claimed is:

1. A process for manufacturing primary mercaptans which comprises reacting hydrogen sulfide with an aliphatic α-olefin having from 2–30 carbon atoms or the substituted derivatives of said α-olefins, wherein the substituents are selected from the group consisting of cyano, carboxyl, carbonyl, tertiary amine, halogen, sulfoxide, sulfone, hydroxyl, ether, thioether, carboxylic ester, amide, trivalent phosphorus, and pentavalent phosphorus in the presence of:

(1) a free radical initiating compound selected from the group consisting of organic azo compounds, peroxides, peracids and percarbonates; and
(2) a pentavalent organic phosphorus compound, effective as a promoter, and having the formula:

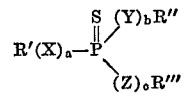

wherein X, Y and Z are each a chalcogen having an atomic weight between 15 and 33; $a$, $b$ and $c$ are each equal to 0 or 1; and R', R" and R''' are each hydrocarbon radicals having from 1 to 20 carbon atoms; wherein said phosphorus compound is present in an amount of from about 0.001 to 1.0 mole per mole of α-olefin.

2. The process of claim 1 wherein the temperature ranges from about 0° C. to about 160° C.

3. The process of claim 1, wherein the hydrogen sulfide is present in an amount ranging from about 1 mole to about 20 moles per mole of said α-olefin.

4. The process of claim 1, wherein said free radical initiating compound is present in an amount ranging from about 0.0001 mole to about 0.01 mole per mole of said α-olefin.

5. The process of claim 1, wherein said α-olefin is selected from the group consisting of ethylene, propylene, and 1,3-butadiene.

6. The process of claim 1, wherein R', R" and R''' are each selected from the group consisting of alkyl having from 1 to 4 carbon atoms and phenyl.

7. The process of claim 1, wherein said free radical initiating compound is selected from the group consisting of azobisisobutyronitrile, azobis (dimethylvaleronitrile), hydroperoxide, benzoyl peroxide, ditertiary butyl peroxide, tertiarybutyl hydroperoxide, isopropyl percarbonate and tertiary butyl peracetate.

8. The process of claim 1 wherein said process is run in the presence of an inert diluent.

References Cited
UNITED STATES PATENTS 3,223,738   12/1965   Crain et al. _____ 260—609 D
2,386,772   10/1945   Badertscher et al. __ 260—609 B LEWIS GOTTS, Primary Examiner D. R. PHILLIPS, Assistant Examiner U.S. Cl. X.R.

260—465.1, 470, 481 R, 516, 526 S, 558 S, 561 S, 593 R, 583 EE, 606.5 R